(12) United States Patent
Uchida et al.

(10) Patent No.: US 7,107,206 B1
(45) Date of Patent: *Sep. 12, 2006

(54) LANGUAGE CONVERSION SYSTEM

(75) Inventors: Hiroshi Uchida, Chigasaki (JP); Meiying Zhu, Yokohama (JP)

(73) Assignee: United Nations, New York, NY (US)

( * ) Notice: Subject to any disclaimer, the term of this patent is extended or adjusted under 35 U.S.C. 154(b) by 612 days.

This patent is subject to a terminal disclaimer.

(21) Appl. No.: 10/130,357

(22) PCT Filed: Nov. 17, 2000

(86) PCT No.: PCT/JP00/08116

§ 371 (c)(1),
(2), (4) Date: Sep. 4, 2002

(87) PCT Pub. No.: WO01/39035

PCT Pub. Date: May 31, 2001

(30) Foreign Application Priority Data

Nov. 17, 1999 (JP) .................................. 11/327526

(51) Int. Cl.
*G06F 17/28* (2006.01)

(52) U.S. Cl. .................................. 704/2; 704/8; 704/9

(58) Field of Classification Search .................... 704/2, 704/8, 9
See application file for complete search history.

(56) References Cited

U.S. PATENT DOCUMENTS 5,175,684 A * 12/1992 Chong ............................. 704/3
5,268,839 A * 12/1993 Kaji ................................ 704/2

(Continued)

FOREIGN PATENT DOCUMENTS

CN 1013006 B 6/1991

(Continued)

OTHER PUBLICATIONS

H. Uchida, et al, "Interlingua for Multilingual Machine Translation" The Fourth Machine Translation Summit, 1993, pp. 157-169.

(Continued)

*Primary Examiner*—Tālivaldis Ivars Šmits
*Assistant Examiner*—Eunice Ng
(74) *Attorney, Agent, or Firm*—Mattingly, Stanger, Malur & Brundidge, P.C.

(57) ABSTRACT

A system is disclosed which allows communication between various kinds of languages. The conversion processing portion (300) rewrites components of the representation in the natural language constructing given natural language representation to universal language elements corresponding thereto in the universal language dictionary (210). The conversion processing portion (300) joins multiple rewritten universal language elements by applying the rewriting rules (220) in accordance with an order in universal language element and creates representation in universal language, which is represented in the binary relation. A reverse-conversion processing portion (350) resolves representation in universal language represented in the binary relation to universal language elements constructing joins therein with reference to the rewriting rules (220) in accordance with rules for representation in the binary relation, which are included in the rules. The reverse-conversion processing portion (350) rewrites the resolved universal language elements to components constructing the natural language representation with reference to the universal language dictionary (120) in order to create representation in natural language.

18 Claims, 7 Drawing Sheets

U.S. PATENT DOCUMENTS

| | | | |
|---|---|---|---|
| 5,426,583 A * | 6/1995 | Uribe-Echebarria Diaz De Mendibil | 704/9 |
| 5,432,948 A * | 7/1995 | Davis et al. | 704/2 |
| 5,490,061 A * | 2/1996 | Tolin et al. | 704/2 |
| 5,541,837 A * | 7/1996 | Fushimoto | 704/2 |
| 5,587,903 A * | 12/1996 | Yale | 704/9 |
| 5,884,247 A * | 3/1999 | Christy | 704/7 |
| 6,092,035 A * | 7/2000 | Kurachi et al. | 704/3 |
| 6,233,546 B1 * | 5/2001 | Datig | 704/7 |
| 6,275,789 B1 * | 8/2001 | Moser et al. | 704/7 |
| 6,356,866 B1 * | 3/2002 | Pratley et al. | 704/9 |
| 6,704,700 B1 * | 3/2004 | Uchida et al. | 704/2 |

FOREIGN PATENT DOCUMENTS

| | | |
|---|---|---|
| JP | 60238966 A * | 11/1985 |
| JP | 414175 | 1/1992 |
| JP | 6325080 | 11/1994 |
| JP | 10162007 | 6/1998 |

OTHER PUBLICATIONS

Universal Networking Language (UNU/IAS/UML), Version 97.7.7, pp. 1-2.

* cited by examiner

FIG.3

UNIVERSAL LANGUAGE DICTIONARY 210

| |
|---|
| a(".@indef"), DET |
| the(".@def"), DET |
| . . . |
| question("question(icl>thing)"), N |
| man("person"), N |
| . . . |
| ask("ask(icl>do)"), VTSTM |
| . . . |
| ed(".@past"), ENDING |
| . . . |

FIG.4

REWRITING RULES 220

| NUMBER | RULES |
|---|---|
| 1 | S → NP (agt) VP |
| 2 | VP → VT (obj) NP |
| 3 | NP → DET N |
| 4 | VT → VTSTM ENDING |
| 5 | DET → a(".@indef") |
| 6 | DET → the(".@def") |
| 7 | N → question("question(icl>thing)") |
| 8 | N → man("person") |
| 9 | VTSTM → ask("ask(icl>do)") |
| 10 | ENDING → ed(".@past") |

LANGUAGE CONVERSION SYSTEM

TECHNICAL FIELD

The present invention relates to a technology for overcoming language problems in translation, interpretation and so on, for information exchanges and/or information storage. More particularly, the present invention relates to a language conversion technology, which is suitable for information exchanges and information storage performed in computers, networks and so on and which can be applied to machine translation, machine interpretation and so on.

BACKGROUND OF THE ART

Today in the Internet age, people's activities have been spread internationally. During international activities, communication is the most important. Accordingly, difference in language is an important matter. However, a perfect global common language does not exist at the present time. Even widely-used English cannot be the global common language. In fact, people belong to various language zones, and each of them desires communication by using his/her native language.

Currently, in order to achieve the communication between different languages, translation between these languages is necessary. In some cases, another language which can be converted from both languages must lie between. Translation generally relies on human power. Alternatively, translation software has been developed for some languages, and machine translation may be performed therefor.

In fact, conventional translation software analyzes a construction and a meaning of a sentence written in a certain language. Then, words to be translated into are used to rewrite elements of the sentence according to the grammar thereof. Therefore, perfect translation is significantly difficult to achieve. Even the translation between very similar language can hardly reach to 100%.

Human beings create information expressed in languages under various conditions in various fields such as reporting, transaction, literature, and entertainment regardless of their used languages. Information written in a language is generally stored individually in each form such as printed form, digital data form, or the like in the language the information is originally written. The information may be translated into a different language and may be stored in translated form as well. Therefore, having the same content information may be stored in each different language. This cannot be considered efficient way in the network age. Especially, when the content is changed, not only the original text must be changed but also the changed part must be translated in all of the translated text. Accordingly, it is not efficient way either in view of document management.

In general, information originally written in one language is not translated into a different language in many cases. Especially, it is rare to translate it into many languages. Therefore, exchanges of information between people using different languages are naturally limited.

Under this condition, it is desirable to develop a system which can achieve communication among people using various kinds of languages easily and accurately with small cost. Further, it is desired to accumulate information independent of a specific language and to translate the information into a desired language as necessary.

DISCLOSURE OF INVENTION

The objective of the present invention is to provide a language translation system, whereby communication among various kinds of language can be achieved easily and accurately with small costs.

In order to achieve the objective, a system for converting language according to the fist aspect of the present invention includes a conversion rule portion for storing rewriting rules corresponding to at least one kind of natural language, which are referred to for converting between representation in natural language and representation in universal language, a conversion processing portion for converting representation in given natural language to representation in universal language by referring the rewriting rules corresponding to the natural language, which is stored in the conversion rule portion, and a reverse-conversion processing portion for converting representation in universal language to representation in target natural language by referring rewriting rules corresponding to the target natural language which is stored in the converted rule portion. The conversion rule portion has, as the rewriting rules for corresponding natural language, a universal language dictionary for defining natural language elements constructing natural language by universal language elements constructing universal language, which correspond to information that each of natural language elements has, and rewriting rules for stipulating a join relation between the universal language elements arranged in accordance with a sentence construction in natural language and for representing the join relation in a binary relation including two universal words and a relation indicating that they have a certain relation. The conversion processing portion performs processing for rewriting components constructing the natural language representation to universal language elements corresponding thereto in the universal language dictionary with reference to the universal language dictionary corresponding to the natural language and processing for joining multiple rewritten universal language elements by applying the rewriting rules corresponding to the target natural language in accordance with an order in universal language element and for creating representation in universal language, which is represented in the binary relation, in accordance with a rule for representation in the binary relation. The reverse-conversion processing portion performs processing for resolving representation in universal language represented in the binary relation to universal language elements constructing joins therein with reference to the rewriting rules corresponding to the target natural language in accordance with rules for representation in the binary relation, which are included in the rules, and processing for rewriting the resolved universal language elements to components constructing the natural language representation with reference to the universal language dictionary corresponding to the target natural language in order to create representation in the target natural language.

Further, a system for converting language according to the second aspect of the present invention includes a conversion rule portion for storing rewriting rules corresponding to at least one kind of natural language, which are referred to for translating between representation in natural language and representation in universal language, and a reverse-conversion processing portion for translating representation in given universal language to representation in natural language by referring the rewriting rules stored in the conversion rule portion. The conversion rule portion has, as the rewriting rules for corresponding natural-language, a universal language dictionary for defining natural language elements constructing natural language by universal language elements constructing universal language, which correspond to information that each of natural language elements has, and rewriting rules for stipulating a join relation between the universal language elements arranged in accordance with a sentence construction in natural language and for representing the join relation in a binary relation including two universal words and a relation indicating that they have a certain relation. The reverse-conversion processing portion performs processing for resolving representation in universal language represented in the binary relation to universal language elements constructing joins therein with reference to the rewriting rules corresponding to the target natural language in accordance with rules for representation in the binary relation, which are included in the rules, and processing for rewriting the resolved universal language elements to components constructing the natural language representation with reference to the universal language corresponding to the target natural language in order to create representation in the target universal language.

BRIEF DESCRIPTION OF THE DRAWINGS

FIG. 3 is an explanatory diagram schematically showing an example of the construction of a universal language dictionary used in the present invention.

FIG. 4 is an explanatory diagram schematically showing an example of a construction of a rewriting rule used in the present invention.

BEST MODE FOR CARRYING OUT THE INVENTION

An embodiment of the present invention will be descried below with reference to drawings. The present invention will be described by using, as an example, a case where representation in English is used as representation in the natural language and representation in universal language is created based thereon. Of course, it is possible to create representation in the universal language based on various languages. Further, it is possible to convert from universal language to natural language.

According to the present invention, the universal language to be used to create for representation is a language, which can be basically handled by computers and also used for communication via network. Therefore, notations for the universal language may be enough if they can be handled by computers, such as numerals. However, it may be represented in a human-understandable manner. For example, codes in the universal language can be coordinated to notations in a specific natural language. In this embodiment, an example where notations in the universal languages are based on English is used. This is because English is a widely used language and is also widely used for notation of the computer language. Of course, the notation of the universal language may be based on a non-English language. Alternatively, it may be a notation in an artificial language, which itself can be understood by human beings.

Figure 1:
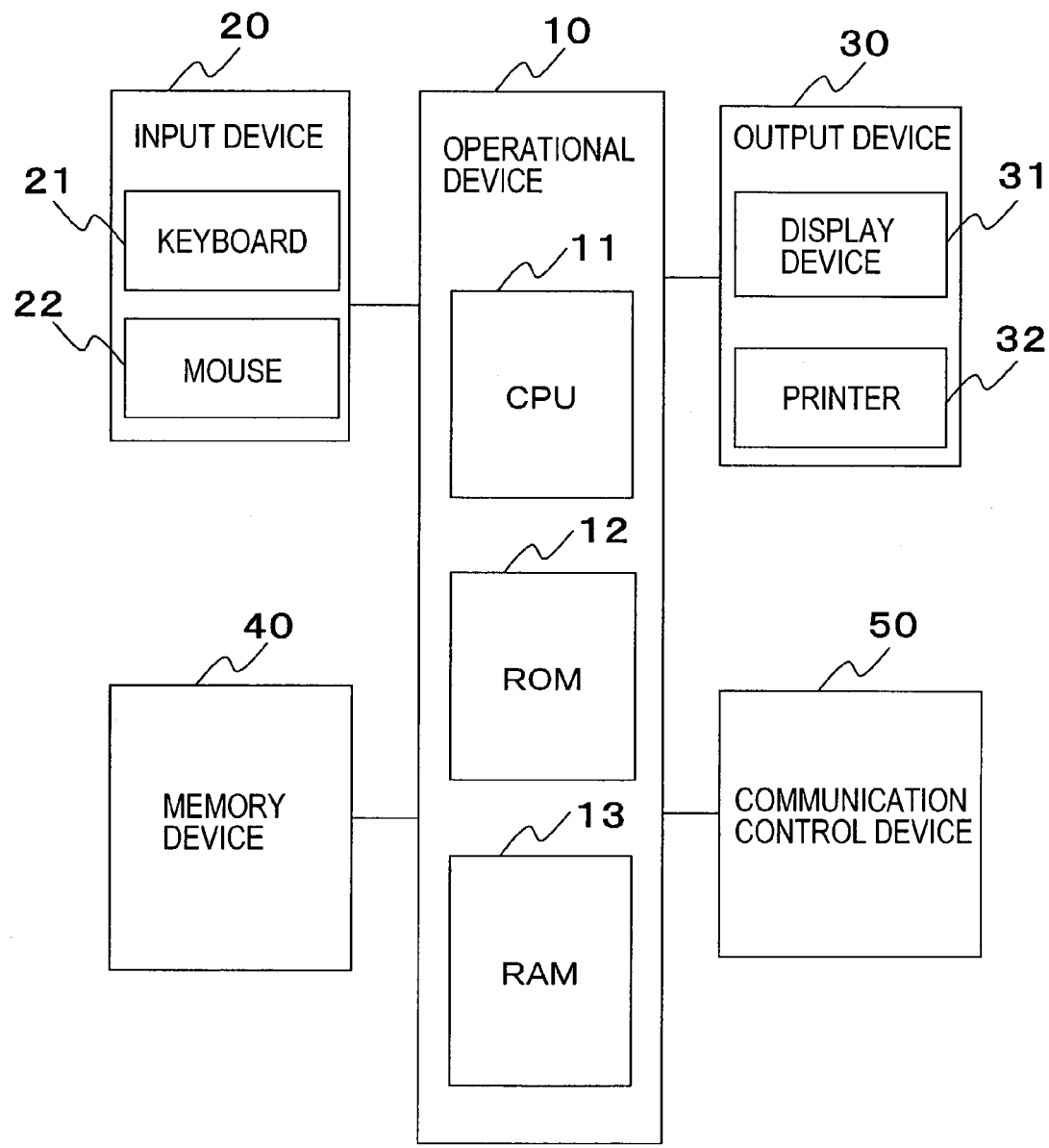
FIG. 1 is a block diagram showing an example of a construction of a hardware system used in the present invention.

An example of the construction of a hardware system, which can be used for the construction of a language translation system according to the present invention will be shown in FIG. 1. This system can be used for both cases where representation in universal language is created from representation in natural language (conversion) and where representation in natural language is created from representation in universal language (reverse-translation). Therefore, a system for performing the conversion and the reverse-conversion can be configured in the same hardware system. Here, reverse-conversion is to convert representation in universal language to representation in any of natural languages, and is not limited to the restoration of the representation in the original natural language.

FIG. 1 shows an example of a construction of a hardware system, which can be used to construct a representation system in the universal language according to the present invention. A generic computer system is shown in FIG. 1. That is, the hardware system shown in FIG. 1 has an operational device 10, an input device 20 having a keyboard 21 and a mouse 22, an output device 30 having a display device 31 and a printer 32, a memory device 40 including a hard disk device and so on, and a communication control device 50 for connecting to networks. Here, the input device 20 and the output device 30 are both generic terms. Accordingly, for example, the output device 30 does not have to be a device having the display device 31 and the printer 32.

The operational device 10 has a central processing unit (CPU) 11, a read only memory (ROM) 12 and a random access memory (RAM) 13. The CPU 11 loads application programs into the RAM 13 and executes the same installed in the memory device 40 in order to perform processing of different kinds of applications. One of the application programs is a program for performing processing for creating representation in universal language used in this embodiment. The program is provided by a recording medium such as CD-ROM and a flexible disk. Further, the program may be obtained by downloading it from a server, which provides programs, over a network or the like. In both cases, it is translated into an executable form and is stored in the memory device 40 according to this embodiment.

Furthermore, according to this embodiment, rewriting rules are used for the conversion between a natural language and a universal language. Like the above-mentioned programs, the rewriting rules may be provided in a form recorded in a recording medium. Alternatively, they can be obtained over a network. Then, the rewriting rules are stored in the memory device 40. The rewriting rules are provided by corresponding to natural languages, respectively. Here, the same rewriting rules may be provided and be applied to two or more languages being common in that the constructions are similar and/or that many words are in common.

Figure 2:
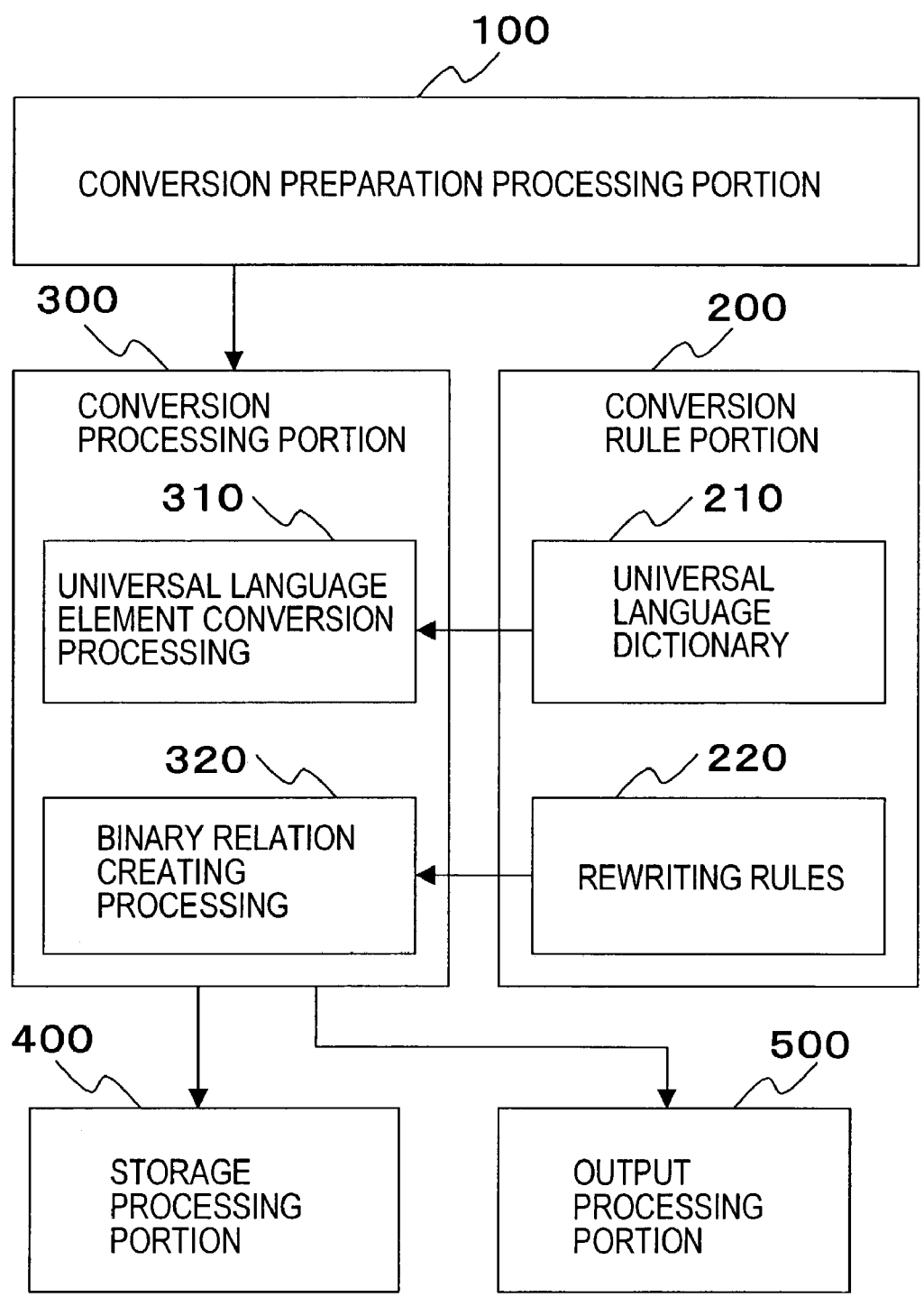
FIG. 2 is a block diagram of the functional construction of a system for converting from representation in natural language into representation in universal language, which is used in this embodiment.

FIG. 2 shows the functional construction of a system for converting representation in natural language to representation in universal language, which is used in this embodiment. As shown in FIG. 2, the construction includes a conversion preparation processing portion 100 for preparing data represented in natural language, on which representation in universal language is based, a conversion rule portion 200 for storing rewriting rules to be referred to for converting representation in natural language to representation in universal language so as to be compliant with at least one kind natural language, a conversion processing portion 300 for performing conversion processing of converting representation in natural language given by the conversion preparation processing portion 100 into representation in universal language by referring to the rewriting rules stored in the conversion rule portion 200, a storage processing portion 400 for performing processing to store the created representation in universal language in the memory device 40, and an output processing portion 500 for performing processing for outputting representation in the process of the creation processing and after creation processing.

The conversion preparation processing portion 100 performs processing for capturing data represented in natural language to which the translation processing portion 300 refers. The capturing processing may include following processes, for example: There may be a process for receiving inputs of character string data representing representation in natural language, which has been input through the keyboard 21. Further, there may be a process for reading from the memory device 40 character string data representing representation in natural language held in the memory device 40. Furthermore, there may be a process for capturing character string data received through the communication control device 50.

The conversion rule portion 200 has a universal language dictionary 210 which defines natural language elements constructing natural language in universal language elements constructing universal language, corresponding to information pieces that each of the natural language elements has, and rewriting rules 220 which defines join relations among the universal language elements aligned in accordance with a sentence construction in natural language, and which are used for writing a join relation in a binary relation including two universal languages and a relation indicating they have a specific relation. Both of them are stored in the memory device 40. Here, the universal language dictionary 210 and the rewriting rules 220 are dealt separately in this embodiment. However, The present invention is not limited thereto. For example, the natural language dictionary 210 and the rewriting rules 220 can be dealt collectively as one rewrite rule without making a distinction. Alternatively, each of the universal language dictionary 210 and the rewriting rules 220 can be subdivided furthermore.

The universal language dictionary 210 includes a collection of universal language elements written in symbols used in universal language corresponding to natural language components. As a universal language element, at least one of information defining a meaning indicated by a corresponding component of natural language and information defining an evaluation for a corresponding component of natural language is written. Each universal language element is provided with a sentence element symbol indicating which element of a sentence in natural language the universal language element corresponds to. FIG. 3 schematically shows an example of a structure of the universal language dictionary. In the example shown in FIG. 3, only parts of dictionary elements are shown, of course. The universal language dictionary in the example shown in FIG. 3 includes descriptions such as 'a (".@indef"), DET' and 'man("person"), N' and so on. That is, the descriptions are in form of:

X ("Y"), Z

Here, an element in natural language, that is, in this embodiment, an element in English is written for X. In the above-described example, 'a' and 'man' correspond thereto.

Many of elements in natural language are words. Of course, non-word elements may be written. For example, elements having the same spelling but having different meanings are defined separately. Further, root form, a past form and a past participle of an irregular verb are dealt as separate elements.

Elements described herein are not limited to independent words. For example, parts such as a stem and a suffix are also dealt separately. In this case, they are added to each element as information indicating the characteristic thereof. For example, information indicating a tense, or information indicating a plural form and so on are added thereto. The stem and the suffix of a regular verb are separated and are defined as independent elements, respectively. 'ask' and 'ed' shown in FIG. 3 correspond to the stem and the suffix. Furthermore, adding 'ed' at the end of a noun causes the noun to function as an adjective. In this case, it is defined as a suffix having a different characteristic from the one at the end of the verb.

For Y, at least one of information defining a meaning indicated by a corresponding component of natural language and information defining an evaluation for a corresponding component of natural language is written.

The information defining a meaning corresponds to 'person' in the above-described example. Of course, the information defining a meaning is not limited to a noun, but may be a verb or an adjective.

The information defining an evaluation corresponds to '.@indef' in the above-described example. In other words, it defines a characteristic of a noun as an indefinite article and can be information defining a meaning. According to the present invention, they are called attributer.

Information indicating various characteristics such as a tense, an intention, a reason and an event can be written as the information defining a meaning. Further, depending on a condition of a target, multiple kinds of information can be written together by, for example, separating them with a comma or the like. For example, 'question', which is an English word shown in FIG. 3, is defined in the binary relation. That is, it is written as question ("question (icl>thing)"). This defines that 'question' in English is written as 'question' in universal language. Furthermore, it defines that 'question' in universal language has a characteristic of '(icl>thing)'. The '(icl>thing)' is a symbol relating to a concept, and 'question' is defined to be included in a concept of 'thing'. Here, 'thing' indicates a concept of a thing in universal language.

For Y, information defining a meaning and information defining the evaluation can be written together by separating them, for example, by using a comma.

The sentence element symbol is written for Z. It corresponds to 'DET' or 'N' in the above example. The sentence element symbol corresponds to information indicating, for example, a noun in natural language. For example, 'DET' is a symbol meaning a determiner and indicating that it is a sentence element which determines a characteristic of a target noun, such as an article. 'N' is a symbol indicating that it is a sentence element meaning a noun. 'VTSTM' and 'ENDING' are symbols indicating the stem of a transitive verb and a suffix element, respectively.

The rewriting rules 220 stipulates join relations between the universal language elements aligned in accordance with a sentence structure in natural language as indicated by numbers 1 to 10 shown in FIG. 4. For example, in No. 1 in FIG. 4, a relation is shown that a sentence S has NP which is a subject part, and VP which is a verb part, and they are joined by a relation, agt. In No. 2, a relation is shown that VP has VT that is a transitive verb, and NP that is a noun phrase, and they are joined by a relation, obj. The relation will be described later.

In No. 3, a relation is shown that NP corresponding to a noun phrase is joined with DET. In No. 4, a relation is shown that VT corresponding to a transitive verb is joined with VTSTM and ENDING.

Those in No. 5 or below are stipulated in rules different from the rule for No. 1 to 4. For example, in No. 5, a relation is shown that DET is joined with 'a(".@indef")' by removing an element in natural language, that is 'DET(".@indef")'. The same is true in those in No. 6 and after.

According to the present invention, the universal language dictionary 210 and the rewriting rules 220 are used when representation in universal language is created from representation in natural language. The same rewriting rule can be used when representation in natural rule is created from representation in universal language. Therefore, once representation in universal language is created, various representations in natural language can be easily created. How to create representation in universal language by using the universal language dictionary 210 and the rewriting rules 220 will be described later.

The conversion processing portion 300 performs a universal language element rewrite processing 310 for referring the universal language dictionary, to rewrite components constructing a given natural language representation to corresponding universal languages elements in the universal language dictionary. Further, the conversion processing portion 300 performs binary relation creation processing 320 for joining the multiple rewritten universal language elements by using the rewriting rule in accordance with the alignment and for creating representation in universal language represented in the binary relation in accordance with the rule for the notation in the binary relation. The conversion processing is performed by executing a program mainly in the operational device 10.

The storage processing portion 400 performs processing for storing a result processed in the operational device 10 in the memory device 40. The processing is performed by the operational device 10, and the memory device 40 stores data output from the operation device in response to the processing. The data is read as required.

The output processing portion 500 performs processing for displaying input data, processing results and so on in the display device 31 and for causing the printer 32 to print them. The displaying and the printing are performed in separate processes.

Next, the binary relation, which is a feature of the present invention, will be described. The binary relation used in the present invention is defined as a following equation:

[EQ 1]

$$<binary\ relation>::=<relation>[":"<compound\ universal\ word\ ID>]"("\{<universal\ word\ 1>|":"<compound\ universal\ word\ ID\ 1>\}","\{<universal\ word\ 2>|":"<compound\ universal\ word\ ID\ 2>\}")"$$

where
::=indicates that . . . is defined as . . . ;
|indicates disjunction, "or";
[ ] indicates an optional element which can be added as desired
{ } indicates an alternative element;
" " indicates a character and/or a symbol is included therein; and
<xxx> is a variable name.

By using the above equation, various representations can be achieved accurately. The simple examples include:
and(quickly, easily),
and(Mary(icl>person), John(icl>person)).

The former indicates meanings of "quickly" and "easily". The latter indicates meanings of "Mary" and "John". Here, the symbol ( ) indicates that there is a constraint, which is written within the ( ) about the element. This will be described together with the description on universal language.

A compound universal word is a collection based on the binary relation for indicating the compound concept. The compound universal word ID is an identifier for identifying the binary relation belonging to the collection of compound universal words. By specifying the identifier, the compound universal words can be used as a universal word. Here, the compound universal word ID is represented by, for example, alphabet capital letters or two-digit numbers.

Incidentally, also for the universal words, representation of the same content can be referred to by using the universal word ID as shown in Equation 6, which is described later.

The binary relation is a representation in universal language, namely, a sentence block. The binary relation is constructed of two universal words and a relation. In universal language, the binary relation is predefined and stipulated by a symbol having three or fewer characters, which is called a relation. The relation between universal words differs depending on behaviors of the universal words, and a corresponding relation such as agt, and, aoj, obj and icl is used. These relations are predefined, for example, as follows:

Relations agt: a thing which causes an event and: a conjunctive relation between concepts aoj: a thing having an attribute bas: a thing used as the basis and/or degree of comparison cag: a thing which initiates an implicit event cao: a thing having an implicit attribute cnt: an equivalent concept cob: target of an implicit event con: an event and/or a state which conditions a focused event or state coo: a co-occurred event or state for a focused event or state dur: a period of time while an event occurs or a state exists fmt: a range between two things frm: an origin of a thing gol: the final state of object or the thing associated with object ins: the instrument to carry out an event man: the way to carry out an event or a characteristics of a state met: means to carry out an event mod: a thing which restricts a focused object nam: a name of a thing obj: a thing in focus which is directly affected by an event or: select relation between concepts per: reference unit plc: the place where an event occurs or a place where a state exists plf: the place where an event begins or a place where a state becomes true plt: a place where an event ends or a place where a state becomes false pof: whole and part relation pos: possessor of a thing ptn: unfocused thing which initiates an event together pur: the purpose of existence of an event or a thing qua: quantity of a thing or unit rsn: a reason that an event or a state happens scn: a scene where an event occurs seq: a prior event or state of a focused event or state src: the initial state of object or a thing associated with object tim: the time when an event occurs or a state is true tmf: the time when an event starts or a state becomes true tmt: the time when an event ends or a state becomes false to: a destination of a thing via: an intermediate place or state of an event Next, universal language used in the present invention will be described. The universal language will be defined in the equation below. The notation rule for the equation is the same as that in Equation 1.

[EQ 2]

<universal words>::=<title>[<constraint list>][":"<universal word ID>][":"<attribute list>]

The <title> is formed by a character string, and may include buy, or book, for example. The universal language may only need to be handled by computers. Thus, it is not always necessary to represent it in human readable form. However, it is more convenient to define it in human readable form. Therefore, in this embodiment, universal language is defined based on English as described above. No problems will occur even if it is defined in other language, for example, in Japanese.

As apparent from the form of definition equations, in the simplest form, universal language can be constructed only by the title.

In general, there are various constraints on language elements. Accordingly, in this embodiment, one or more constraints are indicated in ( ) as a constraint list. Multiple constraints can be written together. In that case, they are separated by commas. The constraint list is defined as follows:

[EQ 3]

<constraint list>::="("<constraint>[","<constraint>] . . .")"

where . . . means that one or more subjects appear.

A constraint listed in the constraint list is defined as follows:

[EQ 4]

<constraint>::=<relation>{">"|"<"}<universal word>[<constraint list>]|<relation>{">"|"<"}<universal word>[<constraint list>][{">"|"<"}<universal word>[<constraint list>]] . . .

In this way, universal language includes unconstrained basic universal words, restricted universal words having some constraints, and a special type of restricted universal words. The basic universal words include 'go, take, house' in English, for example. The restricted universal words include various universal words, which can be represented by the above-described definitions. As an example, a case where 'state' has four different constraints will be shown as follows.

state (agt>person,obj>information)
    state (equ>nation)
    state (icl>situation)
    state (icl>government)

An example of the special restricted universal words will be represented as follows:

ikebana (icl>activity,obj>flowers)
    samba (icl>dance)

As information identifying the characteristic includes an attribute. The attribute is defined by following equation:

[EQ 5]

<attribute list>::=<attributer>["."<attributer>] . . .

Attributes in universal language include the time relating to a speaker such as past, present and future, perspective of the speaker regarding whether he/she is in hurry, speaker's reference opinion regarding a common topic, speaker's focus on a point that the speaker pays attention to, how strongly the speaker is interested in a topic, and speaker's opinion. Typically, they are defined as follows:

Attributers

| | |
|---|---|
| @ability: | can |
| @ability-past: | could |
| @ability-future: | will be able to |
| @affirmative: | affirmation |
| @apodosis-cond: | conditional apodosis |
| @apodosis-real: | real apodosis |
| @apodosis-unreal: | unreal apodosis |
| @begin just: | indicates that an event has just begun |
| @begin-soon: | indicates that an event is about to begin |
| @complete: | completion |
| @conclusion: | conclusion |
| @confirmation: | confirmation |
| @custom: | custom |
| @def: | definite |
| @emphasis: | emphasis |
| @end-just: | indicates that an event has just ended |
| @end-soon: | indicates that an event is about to end |
| @entry: | focus |
| @exclamation: | admiration |
| @expectation: | expectation |
| @future: | future |
| @generic: | a generic term |
| @grant: | grant |
| @grant-not: | must not |
| @indef: | indefinite |
| @imperative: | order |
| @inevitably: | inevitably |
| @insistence: | insistence |
| @intention: | intention |
| @interrogative: | question |

-continued

| | |
|---|---|
| @invitation: | invitation |
| @may: | permission |
| @not: | denial |
| @obligation: | duty |
| @obligation-not: | no duty |
| @ordinal: | ordinal number |
| @past: | past |
| @politeness: | politeness |
| @possibility: | possible |
| @present: | present |
| @probability: | probability |
| @progress: | in the middle of an event |
| @qfocus: | focus of a question |
| @repeat: | repetition |
| @respect: | respect |
| @should: | naturally |
| @state: | a state, which is reached after an end of an event |
| @theme: | theme |
| @topic: | topic |
| @unexpectation: | unexpectation |
| @will: | will |

Next, universal word ID is used for identifying object by alphabets, numerals and so on in order to specify the object, when, for example, there is representation which can be referred to, or when there is the same representation. The universal word ID can be defined as follows:

[EQ 6]

<universal word ID>::={alphabet capital letter>|<numeral>}{alphabet small letter>|<numeral>}

In addition to alphabet capital letters and small letters and numerals, following symbols can be used along with the letters and numerals to indicate the binary relations applied in this embodiment:

[EQ 7]

"_"|"\*"|"#"|"!"|"$"|"%"|"="|"`"|"~"|"|"|"@"|"+"|"-"|"<"|">"|"?"

Next, a specific example of the creation of representation in universal language according to the present invention will be described. In the example below, a case will be described where representation (a sentence) is created in universal language for English representation (a sentence) of 'the man asked a question'. The universal language dictionary shown in FIG. 3 and the rewriting rule shown in FIG. 4 is used for the creation. Here, the rewriting rule in FIG. 4 is applied from right to left in the creation in universal language. In other words, it is applied in the direction contrary to the direction indicated by an arrow (→) described in the rewriting rule. Here, the conversion from the universal language to the natural language is performed in the direction indicated by the arrow.

The operational device 10 captures a target sentence to be translated, 'The man asked a question', into the RAM 13 through the translation preparation processing portion 100. In this example, it is input through the keyboard 21. Then, the CPU 11 of the operational device 10 searches for the first word in the English sentence inputted through the universal language dictionary 210. Then, the (".@def"), DET' is retrieved. Then, the rewriting rule 6 in FIG. 4 is applied to obtain the following result:

[EQ 8]

DET(".@def") man asked a question

Next, the CPU 11 searches for the next word, 'man', in the English sentence through the universal language dictionary 210. Then, 'man("person"), N' is retrieved. Then, the rewriting rule 8 in FIG. 4 is applied to obtain the following result:

[EQ 9]

DET(".@def") N("person") asked a question

Next, the CPU 11 searches for the next word, 'asked', in the English sentence through the universal language dictionary 210. Then, 'ask ("ask(icl>do)"), VTSTM' is retrieved. Then, the rewriting rule 9 in FIG. 4 is applied to obtain the following result:

[EQ 10]

DET(".@def") N("person") VTSTM("ask(icl>do)") ed a question

Next, the CPU 11 searches for 'ed', the ending of the word, 'asked', in the above English sentence through the universal language dictionary 210. Then, 'ed(".@past"), ENDING' is retrieved. Then, the rewriting rule 10 in FIG. 4 is applied to obtain the following result:

[EQ 11]

DET(".@def") N("person") VTSTM("ask(icl>do)")
ENDING (".@past") a question

Next, the CPU 11 searches for the next word, 'a', in the English sentence through the universal language dictionary 210. Then, 'a(".@def"), DET' is retrieved. Then, the rewriting rule 5 in FIG. 4 is applied to obtain the following result:

[EQ 12]

DET(".@def") N("person") VTSTM("ask(icl>do)")
ENDING (".@past") DET(".@indef") question Next, the CPU 11 searches for the next word, 'question', in the English sentence through the universal language dictionary 210. Then, "question(icl>thing)" is retrieved. Then, the rewriting rule 7 in FIG. 4 is applied to obtain the following result:

[EQ 13]

DET(".@def") N("person") VTSTM("ask(icl>do)")
ENDING (".@past") DET(".@indef") N("question(icl>thing)")

Next, after confirming that there is no words after the 'question' in the English sentence, the CPU 11 stops dictionary searches and performs further rewriting processing on the rewriting result. The determination that there is no more word to be searched in the English sentence can be performed based on the presence of a period, a question mark, a colon, or the like.

After that, the CPU 11 further performs rewriting by applying rewriting rules 1 to 4.

The CPU 11 reads our sentence element symbols from the beginning of the rewriting result and determines relations between adjacent sentence element symbols from the beginning of the sentence with reference to rewriting rule shown in FIG. 4. For example, in case of the above rewriting result, order of the arrangement sentence element symbols is 'DET, N, VTSTM, ENDING, DET, N' from the beginning. Then, rewriting rule 3 is applied to 'DET' and 'N' to obtain 'NP("person.@def")'. As a result, the following result is obtained:

[EQ 14]

NP("person.@def") VTSTM("ask(icl>do)") ENDING (".@past") DET(".@indef") N("question(icl>thing)")

Next, the CPU 11 applies rewriting rule 4 to 'VTSTM' and 'ENDING' to obtain 'VT ("ask(icl>do).@past")'. As a result, the following result is obtained:

[EQ 15]

NP("person.@def") VT("ask(icl>do).@past") DET
(".@indef") N("question(icl>thing)")

Next, the CPU 11 applies rewriting rule 3 to 'DET' and 'N' to obtain 'NP("question.@indef")'. As a result, the following result is obtained:

[EQ 16]

NP("person.@def") VT("ask(icl>do).@past") NP
("question.@indef")

Next, the CPU 11 determines that there is no target to be rewritten at the ending. Then, the CPU 11 reads out sentence element symbols and determines relations between adjacent sentence element symbols from the beginning of the sentence with reference to rewriting rule shown in FIG. 4. For example, the order of arrangement sentence element symbols is 'NP', 'VT', and 'NP' in case of the above rewriting result. Here, the rewriting rule cannot be applied to 'NP' and 'VT' on the beginning side. Thus, the CPU 11 first applies rewritinge rule 2 to 'VT' and 'NP' in order to obtain the following result:

[EQ 17]

NP("person.@def") VP("ask(icl>do)
(obj>question.@indef).@past")

Furthermore, the CPU 11 reads out sentence element symbols included in the rewritings results and rule 1 is applied thereto. Then, the following result is obtained:

[EQ 18]

S("ask.@.entry(agt>person.def,obj>question.@indef)
")

In this way, the representation in universal language is created. The universal language can be interpreted as following: The word 'ask' in universal language means 'ask' in natural language, and the speaker is focused on 'ask' based on the presence of the attributer 'entry'. The universal word 'ask' has a constraint, and the content of the constraint means that a thing (agt) initiating an event, 'ask' is a definite (.@def), 'person', and that a thing directly influenced by the event is indefinite (.@indef), 'question'.

As apparent from the components, this representation in universal language does not include components in natural language. Therefore, when natural language is created from once-obtained universal language, the conversion becomes possible from/to arbitrary language if there is the rewriting rule corresponding to the language to be converted.

The universal language dictionary and rewriting rule used in the above examples are only parts of the whole. For example, about one million words are prepared for the universal language dictionary. Incidentally, the smaller number of words can be used when the present invention is used to a specific purpose.

Next, a language conversion system for creating representation in natural language based on representation in universal language will be described with reference to FIG. 5.

Figure 5:
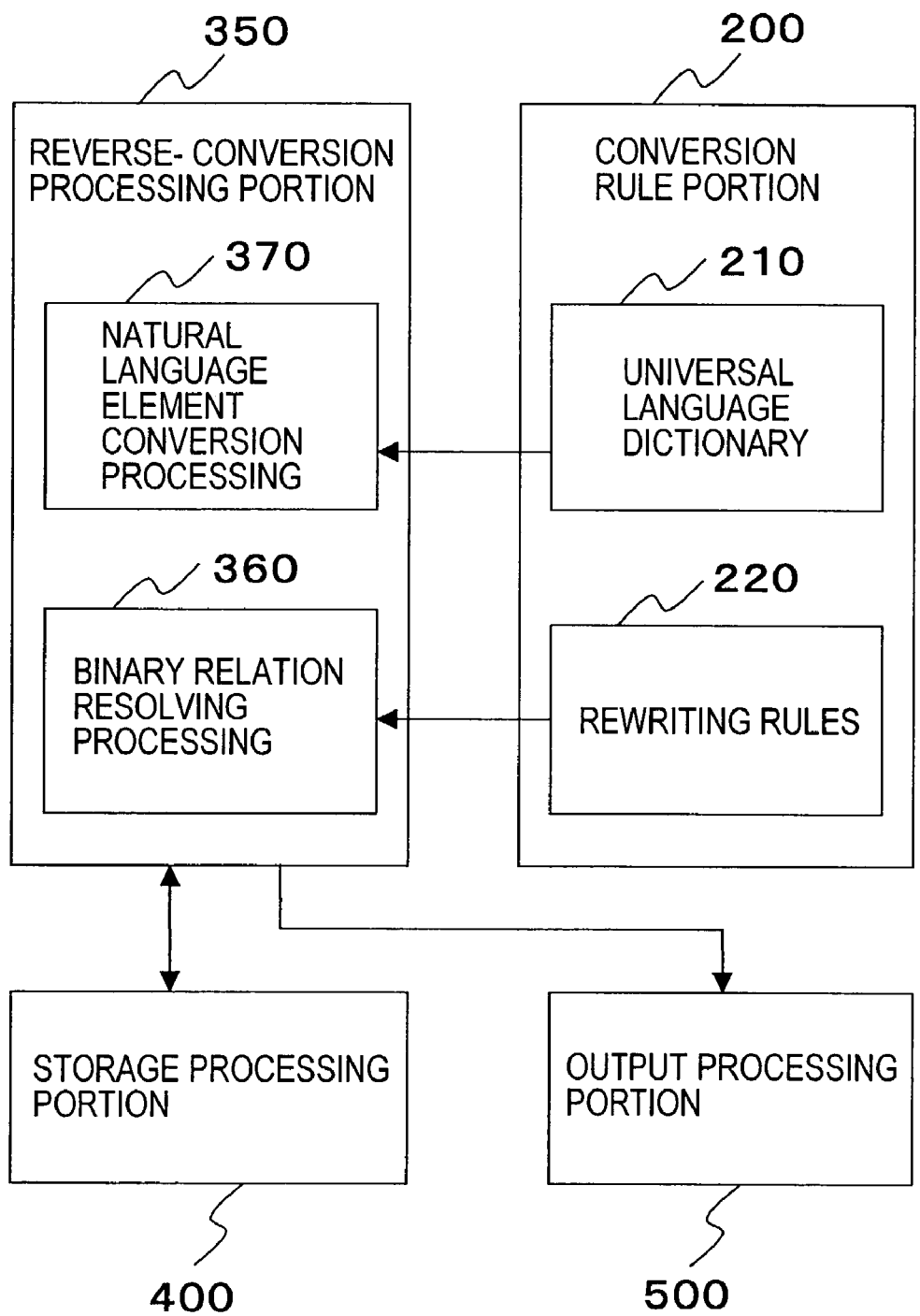
FIG. 5 is a block diagram showing an example of a language conversion system for creating representation in natural language based on representation in universal language.

The language conversion system shown in FIG. 2 and the language conversion system shown in FIG. 5 are combined so that difference in languages can be avoided through communication in natural language-universal language-natural language form.

The language conversion system shown in FIG. 5 includes a conversion rule portion 200 for storing rewriting rules compliant with at least one kind of natural language, which are referred to for converting representation in natural language to representation in universal language, and a reverse-conversion processing portion 350 for performing conversion processing from given representation in universal language to representation in natural language by referring to rewriting rules stored in the conversion rule portion.

The conversion rule portion 200 has the same construction as the one shown in FIG. 2. Rewriting rules corresponding to natural language to be output is prepared. The description on the conversion rule portion 200 has been given already, and therefore it is not repeated here.

The reverse-conversion portion has a binary relation resolving processing 360, which resolves representation in universal language written in the binary relation into universal language elements constructing joins by referring rewriting rules corresponding to target natural language in accordance with a rule, included in the rules, for representation in the binary relation. Further, reverse conversion processing portion has natural language element conversion processing 370, which rewrites the resolved universal language elements to components constructing the natural language representation by referring to a universal language dictionary corresponding to the target natural language in order to create representation in the target natural language. The reverse-conversion processing is performed by executing a program in the operational device 10 mainly.

The storage processing portion 400 and the output processing portion 500 are the same as those described above. However, the storage processing portion 400 reads representation in universal language from the memory device 40 and passes it to the reverse-conversion processing portion 350.

Next, processing according to the present invention will be described which translates universal language representation to representation in natural language.

In this reverse-translation, rewriting rules shown in FIGS. 3 and 4 are used for representation in universal language represented in the binary relation. Here, the rewriting rules shown in FIG. 4 are applied in order from the left to the right in the creation of natural language representation. That is, the rules are applied in the direction indicated by arrows shown in rewriting rules.

Here, a case in the next equation 19 will be described where a universal language representation represented by the binary relation is reverse-translated to representation in natural language. The representation in equation 19 shown below is the same as the representation in above equation 18. Of course, the reverse translation can be performed on arbitrary representation. The CPU 11 of the operational device 10 searches either rewriting rules 220 or the universal language dictionary 210 in the conversion rule portion 200 and retrieves corresponding results thereby to advance the processing below. Therefore, the description regarding the searching process will be omitted below.

[EQ 19]

S("ask.@entry(agt>person.def,obj>question.@indef)
")

The CPU 11 of the operational device 10 resolves 'S' in the universal language representation represented by the binary relation in equation 19 into 'NP' and 'VP' by applying rule 1 to obtain the following result:

[EQ 20]

>    NP("person.@def") VP("ask(icl>do)
>    (obj>question.@indef).@past")

Next, the CPU 11 resolves NP("person.@def") in the result into DET and N by applying rule 3 to obtain the following result:

[EQ 21]

>    DET(".@def")N("person") VP("ask(icl>do)
>    (obj>question.@indef).@past")

Next, the CPU 11 rewrites 'DET(".@def")' in the result to 'The' by applying rule 5 to obtain the following result:

[EQ 22]

>    The N("person")VP("ask(icl>do)
>    (obj>question.@indef).@past")

Next, the CPU 11 rewrites 'N("person")' to 'man' by applying rule 8 to obtain the following result:

[EQ 23]

>    The man VP("ask(icl>do)(obj>question.@indef)
>    .@past")

Next, the CPU 11 rewrites 'VP' to 'VT' and 'NP' by applying rule 2 to obtain the following result:

[EQ 24]

>    The man VT("ask(icl>do).@past")
>    NP("question.@indef")

Next, the CPU 11 rewrites 'VT' to 'VTSTM' and 'END-ING' by applying rule 4 to obtain the following result:

[EQ 25]

>    The man VTSTM("ask(icl>do") ENDING(".@past")
>    NP("question.@indef")

Next, the CPU 11 applies rule 9 and then rule 10 to obtain the following result:

[EQ 26]

>    The man asked NP("question.@indef")

Next, the CPU 11 resolves 'NP' into 'DET N' by applying rule 3 to obtain the following result:

[EQ 27]

>    The man asked DET(".@indef") N("question
>    (icl>thing)")

Next, the CPU 11 applies rule 5 and then rule 7 to obtain the following result:

[EQ 28]

>    The man asked a question

In this way, the representation in English, which is a natural language, is created. While the English is used as a natural language in this embodiment, but no limitation is intended thereto. Various languages such as Japanese, French and Chinese are applicable.

Next, another embodiment of the present invention will be described by using an example of a system, which can perform both conversion processing and reverse-conversion processing.

Figure 6:
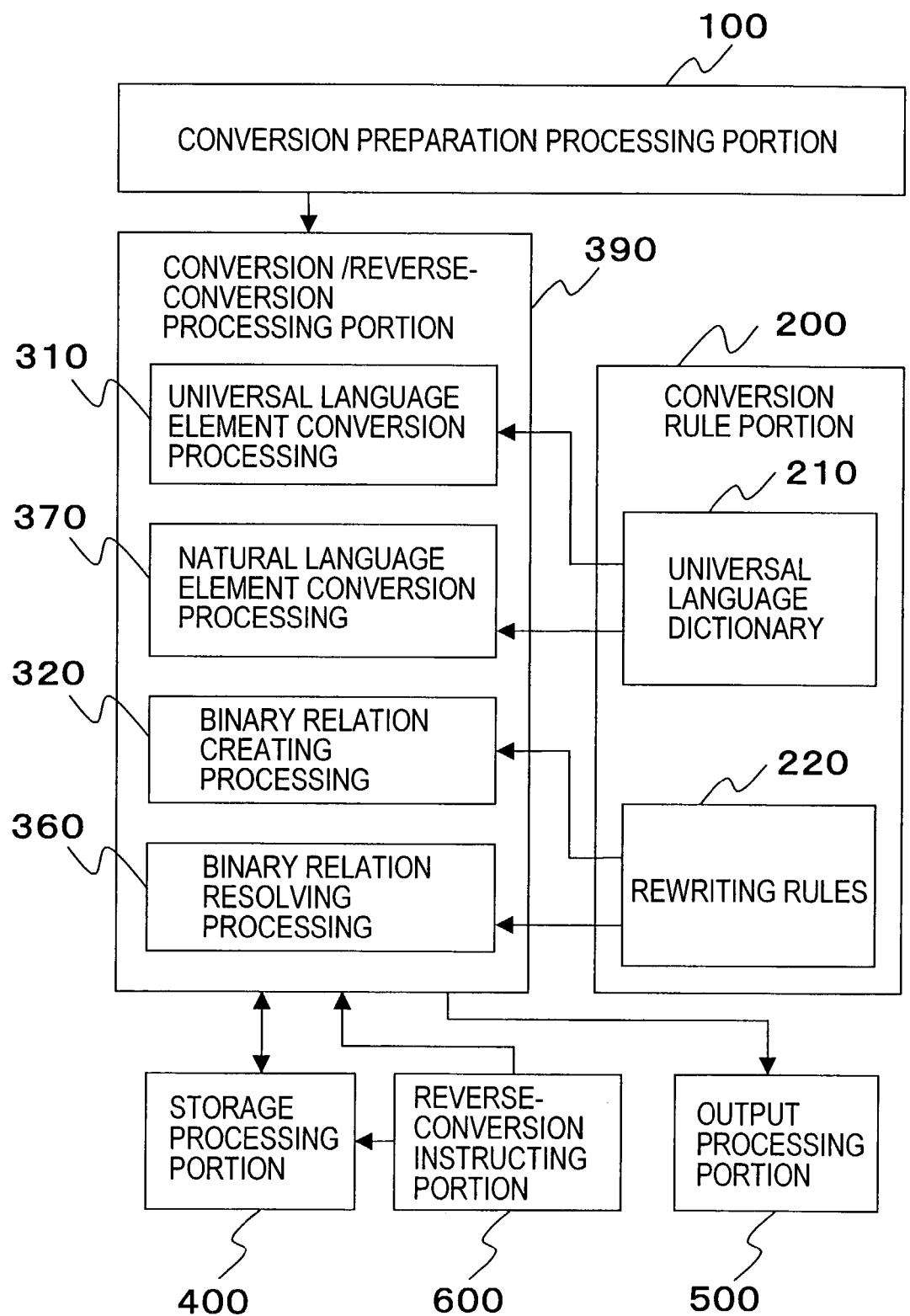
FIG. 6 is a block diagram showing an example of a construction of a system, which can perform translation and reverse-conversion processing.

This embodiment is different from those shown in FIGS. 2 and 5, and includes a translation/reverse-conversion processing portion 390, which can perform convesion and reverse-conversion as shown in FIG. 6. The conversion/reverse-conversion processing portion 390 has universal language element conversion processing 310, binary relation creating processing 320, binary relation resolving processing 360 and a natural language element conversion processing 370. The universal language element conversion processing 310, the binary relation creating processing 320, the binary relation resolving processing 360 and the natural language element conversion processing 370 function in the same manner as those in the system shown in FIGS. 2 and 5, which have been already described above. Thus, the repetitive description will be omitted here.

The conversion rule portion 200 has one or more rewriting rules compliant with natural language. While the conversion rule portion 200 has been already described above. Thus, the repetitive description will be omitted here.

Here, when the conversion rule portion 200 has rewriting rules compliant with, for example, English, the mutual conversion between English and universal language is performed. Further, when there are respective kinds of rewriting rules compliant with English, German, Chinese and Japanese, a sentence represented in the same universal language can be obtained if a sentence with the same content is input in any one of these kinds of language. Then, sentences with the same content, which are represented in English, German, Chinese and Japanese, respectively, are obtained based on the sentence represented in the same universal language.

Figure 7:
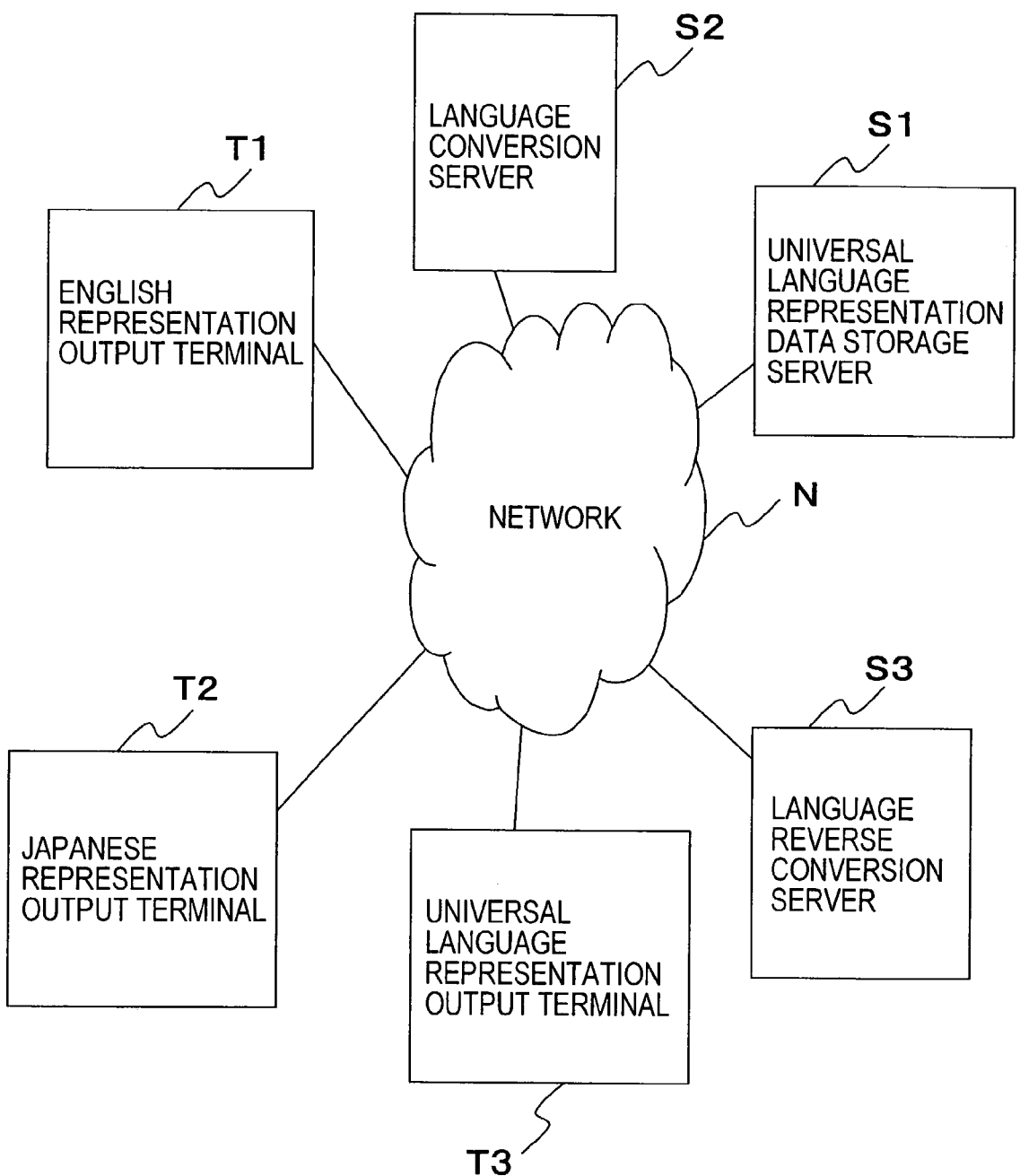
FIG. 7 is an explanatory diagram showing an example of a model, which is applicable for a case where information is exchanged over a network.

An example where one kind of language is translated and reverse-translated by a same hardware system is shown in FIG. 6. However, the present invention is not limited thereto. For example, the present invention can be applied to a case where information is exchanged over a network. FIG. 7 shows one mode in that case.

In the model shown in FIG. 7, a universal language representation data storage server S1 for storing data represented in universal language, which is sent over a network N, and for sending out universal language representation data to the network as requested, a language translation server S2 for translating data represented in natural language, which is sent over the network N, to data represented in universal language and for sending it to the network N, a language reverse translation server S3 for translating data represented in universal language, which is sent over the network N, to data represented in natural language and for sending it to the network N, an English representation output terminal T1 for outputting data represented in English, which is a kind of natural language, to the network, a Japanese representation output terminal T1 for outputting data in Japanese, which is another kind of natural language, to the network, and a universal language representation output terminal T3 are connected to the network N.

Here, the system shown in FIG. 2 may be used as the terminal S2. Further, the system shown in FIG. 5 may be used as the terminal S3. Though not shown in the model in FIG. 7, a server using the system shown in FIG. 6 may be connected thereto.

The universal language representation data storage server S1 stores data represented in the same universal language even though the original data is written in any kind of natural language. By having data represented in the universal language as the original, the version management and the like may be performed centrally. Furthermore, since various data represented in multiple kinds of language are stored in a non-overlapping manner, data server may be used efficiently.

On the other hand, as far as a kind of natural language which can be converted to universal language owing to the presence of server S2 and/or S3, is used, communication in native language can be performed. In addition, by creating rewriting rules compliant with various kinds of natural language under international cooperation the language conversion server S2 and the language reverse-conversion server S3 can be achieved, which are compliant with various kinds of language. Therefore, even people using kinds of language which has not been translated very often, can come in touch with information which originally is in various kinds of languages, in their mother language. As a result, there is an advantage that international exchanges can be performed smoothly.

In this way, according to the present invention, by preparing rewriting rules corresponding to each natural languages, any natural language can be represented in universal language. Also, the universal language is written in a form that it is not influenced by elements and grammar of original natural language. Therefore, when information in one language is communicated to the other language, international communication and efficient storage of the information are allowed by using representation in universal language. The content in language having less converted information can be communicated to many people using different kinds of language easily with low costs like communication in English.

As the universal language of the present invention can be translated to natural language, it can be determined easily whether original representation in natural language is communicated accurately through the representation in universal language by checking reverse-converted representation. Thus, The representation in universal language can be accurate. Furthermore, universal language is written clearly by using a binary relation, and thus the translation from universal language to natural language can be performed accurately. As a result, having the representation in universal language as the original is useful when the same information is communicated internationally.

Although natural language is described in the above example, the present invention can be applied to representation in language which may not be natural language strictly; for example, artificial language such as Esperanto language, or language for machine such as computer language.

According to the present invention, there is an advantage that communication among various languages easily and accurately with small costs.

The invention claimed is:

1. A system for converting language, comprising:
a conversion rule portion for storing rewriting rules corresponding to at least one kind of natural language, which are referred to for converting between representation in natural language and representation in universal language;
a conversion processing portion for converting representation in given natural language to representation in universal language by referring to the rewriting rules corresponding to the natural language, which is stored in the conversion rule portion; and
a reverse-conversion processing portion for converting representation in universal language to representation in target natural language by referring to rewriting rules corresponding to the target natural language, which is stored in the conversion rule portion,
wherein the conversion rule portion has, as the rewriting rules for corresponding natural language,
a universal language dictionary for defining natural language elements constructing natural language by universal language elements constructing universal language, which correspond to information that each of natural language elements has; and rewrite rules for stipulating a join relation between the universal language elements arranged in accordance with a sentence construction in natural language and for representing the join relation in a binary relation including two universal line elements and a relation indicating that they have a certain relation,
wherein the universal language dictionary includes a collection of universal language elements represented by symbols used in universal language in order to be compliant with components in natural language, and a sentence element symbol indicating which of corresponding sentence elements in natural language corresponds to each of the universal language element is added to each universal language element,
wherein the conversion processing portion performs processing for rewriting components constructing the natural language representation to universal language elements corresponding thereto in the universal language dictionary with reference to the universal language dictionary corresponding to the natural language and processing for joining multiple rewritten universal language elements by applying the rewrite rules corresponding to the target natural language in accordance with an order in universal language element and for creating representation in universal language, which is represented in the binary relation, in accordance with a rule for representation in the binary relation, and
wherein the reverse-conversion processing portion performs processing for resolving representation in universal language represented in the binary relation to universal language elements constructing joins therein with reference to the rewrite rules corresponding to the target natural language in accordance with rules for representation in the binary relation, which are included in the rules, and processing for rewriting the resolved universal language elements to components constructing the natural language representation with reference to the universal language dictionary corresponding to the target natural language in order to create representation in the target natural language.

2. A system according to claim 1, wherein:
the conversion rule portion stores plural kinds of rewriting rule corresponding to plural kinds of natural language,
wherein the conversion processing portion creates representation in universal language by using rewriting rules corresponding to a given kind of natural language, and
wherein the reverse-conversion portion creates representation in the target natural language from representation in universal language by using rewriting rules of a type corresponding to the target natural language among the plural kinds of rewriting rules.

3. A system according to claim 1, further comprising:
a communication control portion for performing processing for receiving representation in natural language, which is sent over a network, and processing for outputting representation in natural language, which is converted from representation in universal language, over the network.

4. A system for converting language, comprising:
a conversion rule portion for storing rewriting rules corresponding to at least one kind of natural language, which are referred to for converting between representation in natural language and representation in universal language; and
a reverse-conversion processing portion for reverse-converting representation in given universal language to representation in natural language by referring the rewriting rules stored in the conversion rule portion, wherein the conversion rule portion has, as the rewriting rules for corresponding natural language, a universal language dictionary for defining natural language elements constructing natural language by universal language elements constructing universal language, which correspond to information that each of natural language elements has; and rewriting rules for stipulating a join relation between the universal language elements arranged in accordance with a sentence construction in natural language and for representing the join relation in a binary relation including two universal language elements and a relation indicating that they have a certain relation, wherein the universal language dictionary includes a collection of universal language elements represented by symbols used in universal language in order to be compliant with components in natural language, and a sentence element symbol indicating which of corresponding sentence elements in natural language corresponds to each of the universal language element is added to each universal language element, and wherein the reverse-conversion processing portion performs processing for resolving representation in universal language represented in the binary relation to universal language elements constructing joins therein with reference to the rewriting rules corresponding to the target natural language in accordance with rules for representation in the binary relation, which are included in the rules, and processing for rewriting the resolved universal language elements to components constructing the natural language representation with reference to the universal language dictionary corresponding to the target natural language in order to create representation in the target natural language.

5. A system according to claim 4, further comprising:

a communication control portion for receiving representation in natural language, which is sent over a network, and for outputting converted representation in universal language, over the network.

6. A system according to any one of claims 1, 2, 3, 4 and 5, further comprising:

a storage processing portion for performing processing for storing representation in universal language; and a reverse-conversion instructing portion for accepting an instruction for converting stored representation in universal language to specific natural language for output in order to cause the storage processing portion to perform processing for reading out the stored representation in universal language, and for instructing the reverse-conversion processing portion to translate the read representation in universal language to target natural language.

7. A system according to any one of claims 1, 2, 3, 4 and 5, wherein the conversion processing portion joins the multiple rewritten universal elements by applying the rewriting rules in accordance with an order of the universal language elements based on the sentence element symbol.

8. A system according to any one of claims 1, 2, 3, 4 and 5, wherein at least one of information identifying a meaning represented by a corresponding component in natural language and information identifying an evaluation regarding the corresponding component in natural language is further represented in the universal language dictionary, and wherein the conversion processing portion joins the multiple rewritten universal elements by applying the rewriting rules in accordance with an order of the universal language elements based on the sentence element symbol.

9. A system according to either claim 1 or 4, wherein the universal language dictionary records universal language corresponding to components in natural language in form of:

X ("Y"), Z where a component in natural language is written for X, at least one of information defining a meaning indicated by the component written for X and information defining an evaluation for the component written for above-mentioned X is written for Y, and a sentence element symbol, which indicates which of sentence elements corresponds to the component written for above-mentioned X, is written for Z.

10. A system according to either claim 1 or 4, wherein each of universal words constructing the universal language elements is defined by:

a character string representing itself:

a constraint list listing one or more constraints defined by universal words, respectively, when there are one or more constraints for the universal word;

a universal word ID for identifying the universal word when one or more of the other universal words are used for defining the universal word; and an attribute list listing one or more attributers defined by universal words, respectively when one or more attributers are specified for the universal word, and the universal words are recorded in form of:

<universal words>::=<title>[<constraint list>]
[":"<universal word ID>]["."<attribute list>]

where

::=indicates that . . . is defined as . . . ;

[ ] indicates an element which can be added as desired

" " indicates a character and/or a symbol is included therein;

<xxx> is a variable name; and

<title> includes a character string.

11. A system according to claim 10, wherein the constraint list used for defining the universal words is in form of:

<constraint list>::="("<constraint>[","<constraint>] . . . ")"

where . . . means that one or more subjects appear.

12. A recording medium according to claim 11, wherein a constraint listed in the constraint list is in form of:

<constraint>::=<relation>{">"|"<"}<universal word> [<constraint list>]|<relation>{">"|"<"}<universal word>[<constraint list>][{">"|"<"}<universal word> [<constraint list>]] . . .

where

| indicates disjunction, "or"; and

{ } indicates a select element.

13. A recording medium according to claim 10, wherein the attribute list used for defining the universal words is in form of: <attribute list>::=<attributer> ["."<attributer>].

14. A computer-readable program for causing a computer to perform processing for converting representation in given natural language to representation in universal language by referring rewriting rules, which are given in advance, and processing for reverse-converting representation in universal language to representation in target natural language by referring the rewriting rules, wherein, as the rewriting rules for the corresponding natural language, a universal language dictionary for defining natural language elements constructing natural language by universal language elements constructing universal language, which correspond to information that each of natural language elements has, the universal language dictionary including a collection of universal language elements represented by symbols used in universal language in order to be compliant with components in natural language, and a sentence element symbol indicating which of corresponding sentence elements in natural language corresponds to each of the universal language element is added to each universal language element, and rewriting rules for stipulating a join relation between the universal language elements arranged in accordance with a sentence construction in natural language and for representing the join relation in a binary relation including two universal language elements and a relation indicating that they have a certain relation, are referred to, wherein, when the conversion processing is performed, the computer is caused to perform processing for rewriting components constructing the natural language representation to universal language elements corresponding thereto in the universal language dictionary with reference to the universal language dictionary corresponding to the natural language and processing for joining multiple rewritten universal language elements by applying the rewriting rules corresponding to the target natural language in accordance with an order in universal language element and for creating representation in universal language, which is represented in the binary relation, in accordance with a rule for representation in the binary relation, and wherein, when the reverse-conversion processing is performed, the computer is caused to perform processing for resolving representation in universal language represented in the binary relation to universal language elements constructing joins therein with reference to the rewriting rules corresponding to the target natural language in accordance with rules for representation in the binary relation, which are included in the rules, and processing for rewriting the resolved universal language elements to components constructing the natural language representation with reference to the universal language dictionary corresponding to the target natural language in order to create representation in the target natural language.

15. A computer-readable program for causing a computer to perform processing for converting representation in given universal language to representation in natural language by referring rewriting rules, which are given in advance, wherein, as the rewriting rules, a universal language dictionary for defining natural language elements constructing natural language by universal language elements constructing universal language, which correspond to information that each of natural language elements has, the universal language dictionary including a collection of universal language elements represented by symbols used in universal language in order to be compliant with components in natural language, and a sentence element symbol indicating which of corresponding sentence elements in natural language corresponds to each of the universal language element is added to each universal language element, and rewriting rules for stipulating a join relation between the universal language elements arranged in accordance with a sentence construction in natural language and for representing the join relation in a binary relation including two universal words and a relation indicating that they have a certain relation, are referred to, wherein the computer is caused to perform:

processing for resolving representation in universal language represented in the binary relation to universal language elements constructing joins therein with reference to the rewriting rules corresponding to the target natural language in accordance with rules for representation in the binary relation, which are included in the rules; and processing for rewriting the resolved universal language elements to components constructing the natural language representation with reference to the universal language corresponding to the target natural language in order to create representation in the target natural language.

16. A computer-readable recording medium on which a program according to either claim 14 or claim 15 is recorded.

17. A method for supporting communication in natural language, providing, in a manner accessible from terminals for performing communication over a network, a language conversion server for performing processing for converting representation in natural language to representation in universal language and a language reverse-conversion server for performing processing for converting representation in universal language to representation in natural language, the language conversion server having:

a conversion rule portion for storing plural kinds of rewriting rules corresponding to kinds of natural language to be supported for communication, which are referred for converting between representation in natural language and representation in universal language;

a conversion processing portion for converting representation in natural language to representation in universal language by referring to the rewriting rules corresponding to the natural language, which is stored in the conversion rule portion; and a communication control portion for receiving representation in natural language, which is sent over a network, and for outputting representation converted into universal language, over the network;

the language reverse conversion server having:

a conversion rule portion for storing plural kinds of rewriting rules corresponding to kinds of natural language to be supported for communication, which are referred for converting between representation in natural language and representation in universal language;

a reverse-conversion processing portion for converting representation in universal language to representation in target natural language by referring to the rewriting rules corresponding to the target natural language, which is stored in the conversion rule portion; and a communication control portion for receiving representation in universal language, which is sent over a network, and for outputting representation reverse-converted in natural language, over the network, wherein the conversion rule portion included by both of the language conversion server and the language reverse-conversion server has, as the rewriting rules for corresponding natural language, a universal language dictionary for defining natural language elements constructing natural language by universal language elements constructing universal language, which correspond to information that each of natural language elements has, the universal language dictionary including a collection of universal language elements represented by symbols used in universal language in order to be compliant with components in natural language, and a sentence element symbol indicating which of corresponding sentence elements in natural language corresponds to each of the universal language element is added to each universal language element; and rewriting rules for stipulating a join relation between the universal language elements arranged in accordance with a sentence construction in natural language and for representing the join relation in a binary relation including two universal words and a relation indicating that they have a certain relation, the method comprising the steps of; when representation in natural language sent over the network is received by the language conversion server, performing by the conversion processing portion, processing for rewriting components constructing the received natural language representation to universal language elements corresponding thereto in the universal language dictionary with reference to the universal language dictionary corresponding to the natural language and processing for joining multiple rewritten universal language elements by applying the rewriting rules corresponding to the target natural language in accordance with an order in universal language element and for creating representation in universal language, which is represented in the binary relation, in accordance with a rule for representation in the binary relation; and when representation in universal language sent over the network is received by the language reverse-conversion server, performing by the reverse-conversion processing portion, processing for resolving the received representation in universal language to universal language elements constructing joins therein with reference to the rewriting rules corresponding to the target natural language in accordance with rules for representation in the binary relation, which are included in the rules, and processing for rewriting the resolved universal language elements to components constructing the natural language representation with reference to the universal language dictionary corresponding to the target natural language in order to create representation in the target natural language.

18. A method according to claim 17, further providing a universal language representation data storage server for storing data represented in universal language, which is connected to the language conversion server and the language reverse-conversion server over the network, the method comprising the steps of: receiving and storing, by the universal language representation data storage server, universal language represented data, which is converted by the language converted server, and outputting stored universal language represented data to the language reverse-conversion server.

* * * * *